United States Patent
Ladd et al.

(10) Patent No.: US 10,150,011 B2
(45) Date of Patent: Dec. 11, 2018

(54) GOLF BALL INCORPORATING AT LEAST THREE ADJACENT IONOMERIC AND/OR HNP-BASED LAYERS HAVING MULTIPLE RELATED PROPERTY GRADIENTS THERE BETWEEN

(71) Applicant: Acushnet Company, Fairhaven, MA (US)

(72) Inventors: Derek A. Ladd, Acushnet, MA (US); Edmund A. Hebert, Mattapasett, MA (US); Douglas E. Jones, Dartmouth, MA (US); Donald A. Serino, Plymouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/072,467

(22) Filed: Mar. 17, 2016

(65) Prior Publication Data
US 2017/0266511 A1    Sep. 21, 2017

(51) Int. Cl.
*A63B 37/06* (2006.01)
*A63B 37/00* (2006.01)

(52) U.S. Cl.
CPC ...... *A63B 37/0094* (2013.01); *A63B 37/0031* (2013.01); *A63B 37/0033* (2013.01); *A63B 37/0043* (2013.01); *A63B 37/0045* (2013.01); *A63B 37/0059* (2013.01); *A63B 37/0062* (2013.01); *A63B 37/0064* (2013.01); *A63B 37/0075* (2013.01); *A63B 37/0076* (2013.01)

(58) Field of Classification Search
CPC ............ A63B 37/0076; A63B 37/0072; A63B 37/0092
USPC ............................................................ 473/376
See application file for complete search history.

(56) References Cited

U.S. PATENT DOCUMENTS

| | | |
|---|---|---|
| 3,264,272 A | 8/1966 | Rees |
| 4,351,931 A | 9/1982 | Armitage |
| 5,120,791 A | 6/1992 | Sullivan |

(Continued)

*Primary Examiner* — Raeann Gorden
(74) *Attorney, Agent, or Firm* — Margaret C. Barker

(57) ABSTRACT

Golf ball having at least three layers comprising ionomeric and/or HNP compositions, wherein for each two adjacent layers, a relationship is established between a ratio of the volumes of the two adjacent layers and a ratio of the percent neutralizations of those two layers such that the volumes and % neutralizations of all layers are interrelated and interdependent to produce unique and desirable playing characteristics. In one embodiment, a golf ball of the invention has T layers, wherein T≥3 and each of T layers has a different volume "V" and comprises an ionomeric and/or HNP composition having a different % neutralization "N". Furthermore, each of n inner layers of the T layers (n<T) has an adjacent surrounding layer n+1 such that a volume $V_n$ and a % neutralization $N_n$ of each inner layer and a volume $V_{(n+1)}$ and % neutralization $N_{(n+1)}$ of each adjacent surrounding layer n+1 satisfy the relationship $(V_n - V_{(n+1)})/V_n \geq (N_n - N_{(n+1)})/N_{(n+1)}$.

9 Claims, 1 Drawing Sheet

(56) References Cited

U.S. PATENT DOCUMENTS

| | | |
|---|---|---|
| 5,691,066 A | 11/1997 | Rajagopalan |
| 5,691,418 A | 11/1997 | Hagman et al. |
| 5,981,654 A | 11/1999 | Rajagopalan |
| 6,001,930 A | 12/1999 | Rajagopalan |
| 6,057,403 A | 5/2000 | Sullivan et al. |
| 6,187,864 B1 | 2/2001 | Rajagopalan |
| 6,274,298 B1 | 8/2001 | Nair et al. |
| 6,353,050 B1 | 3/2002 | Bastiaens et al. |
| 6,562,906 B2 | 5/2003 | Chen |
| 6,653,382 B1 | 11/2003 | Statz et al. |
| 6,747,110 B2 | 6/2004 | Rajagopalan |
| 6,756,436 B2 | 6/2004 | Rajagopalan et al. |
| 6,762,246 B2 | 7/2004 | Chen |
| 6,777,472 B1 | 8/2004 | Statz et al. |
| 6,815,480 B2 | 11/2004 | Statz et al. |
| 6,824,477 B2 | 11/2004 | Rajagopalan et al. |
| 6,894,098 B2 | 5/2005 | Rajagopalan et al. |
| 6,919,393 B2 | 7/2005 | Mano et al. |
| 6,953,820 B2 | 10/2005 | Statz et al. |
| 6,981,926 B2 | 1/2006 | Sullivan et al. |
| 6,988,962 B2 | 1/2006 | Sullivan et al. |
| 6,994,638 B2 | 2/2006 | Rajagoapalan et al. |
| 7,009,002 B2 | 3/2006 | Rajagopalan et al. |
| 7,140,981 B2 | 11/2006 | Sullivan et al. |
| 7,147,578 B2 | 12/2006 | Nesbitt et al. |
| 7,207,903 B2 | 4/2007 | Sullivan et al. |
| 7,211,008 B2 | 5/2007 | Sullivan et al. |
| 7,273,903 B2 | 9/2007 | Chen |
| 7,312,267 B2 | 12/2007 | Kennedy et al. |
| 7,357,736 B2 | 4/2008 | Sullivan et al. |
| 7,365,128 B2 | 4/2008 | Sullivan |
| 7,375,151 B2 | 5/2008 | Statz et al. |
| 7,402,629 B2 | 7/2008 | Rajagopalan |
| 7,452,290 B2 | 11/2008 | Sullivan et al. |
| 7,468,006 B2 | 12/2008 | Sullivan et al. |
| 7,504,448 B2 | 3/2009 | Chen |
| 7,513,838 B2 | 4/2009 | Sullivan et al. |
| 7,517,289 B2 | 4/2009 | Sullivan et al. |
| 7,530,907 B2 | 5/2009 | Sullivan et al. |
| 7,607,994 B2 | 10/2009 | Hebert et al. |
| 7,607,995 B2 | 10/2009 | Sullivan et al. |
| 7,641,571 B2 | 1/2010 | Hebert et al. |
| 7,654,916 B2 | 2/2010 | Sullivan et al. |
| 7,654,917 B2 | 2/2010 | Sullivan et al. |
| 7,731,606 B2 * | 6/2010 | Sullivan ............. A63B 37/0003 473/376 |
| 7,731,607 B2 | 6/2010 | Sullivan et al. |
| 7,744,488 B2 | 6/2010 | Sullivan et al. |
| 7,766,767 B2 | 8/2010 | Sullivan et al. |
| 7,766,768 B2 | 8/2010 | Sullivan et al. |
| 7,771,292 B2 | 8/2010 | Hebert et al. |
| 7,775,905 B2 | 8/2010 | Sullivan et al. |
| 7,833,112 B2 | 11/2010 | Sullivan et al. |
| 7,867,106 B2 | 1/2011 | Sullivan et al. |
| 7,871,342 B2 | 1/2011 | Dalton et al. |
| 7,878,927 B2 | 2/2011 | Hebert et al. |
| 7,887,437 B2 | 2/2011 | Sullivan et al. |
| 7,887,438 B2 | 2/2011 | Sullivan et al. |
| 7,935,004 B2 | 5/2011 | Dalton et al. |
| 7,963,862 B2 | 6/2011 | Sullivan et al. |
| 7,967,701 B2 | 6/2011 | Sullivan et al. |
| 8,002,646 B2 | 8/2011 | Sullivan et al. |
| 8,193,283 B2 | 6/2012 | Chen |
| 8,241,147 B2 | 8/2012 | Sullivan et al. |
| 8,241,149 B2 | 8/2012 | Sullivan et al. |
| 8,262,512 B2 | 9/2012 | Sullivan et al. |
| 8,308,586 B2 | 11/2012 | Sullivan et al. |
| 8,323,123 B2 | 12/2012 | Sullivan et al. |
| 8,337,332 B2 | 12/2012 | Sullivan et al. |
| 8,382,611 B2 | 2/2013 | Sullivan et al. |
| 8,410,219 B2 | 4/2013 | Chen |
| 8,410,220 B2 | 4/2013 | Chen |
| 8,876,635 B1 | 11/2014 | Ogg |
| 8,974,318 B1 | 3/2015 | Ogg |
| 8,987,360 B2 | 3/2015 | Sullivan et al. |
| 9,095,748 B2 | 8/2015 | Sullivan et al. |
| 9,132,319 B2 | 9/2015 | Sullivan et al. |
| 2002/0013413 A1 | 1/2002 | Bellinger et al. |
| 2002/0155906 A1 | 10/2002 | Sullivan et al. |
| 2003/0130434 A1 | 7/2003 | Statz et al. |
| 2003/0225197 A1 | 12/2003 | Rajagopalan et al. |
| 2004/0220343 A1 | 11/2004 | Chen |
| 2005/0020741 A1 | 1/2005 | Chen |
| 2005/0049367 A1 | 3/2005 | Rajagopalan et al. |
| 2005/0148725 A1 | 7/2005 | Statz et al. |
| 2006/0128904 A1 | 6/2006 | Sullivan et al. |
| 2006/0166759 A1 | 7/2006 | Kennedy, III et al. |
| 2006/0211518 A1 * | 9/2006 | Sullivan .................. C08L 23/08 473/373 |
| 2006/0293464 A1 | 12/2006 | Rajagopalan et al. |
| 2007/0015608 A1 | 1/2007 | Ladd et al. |
| 2007/0105659 A1 | 5/2007 | Kennedy |
| 2007/0203277 A1 | 8/2007 | Chen |
| 2008/0220905 A1 | 9/2008 | Sullivan et al. |
| 2009/0017940 A1 | 1/2009 | Sullivan et al. |
| 2009/0118040 A1 | 5/2009 | De Garavilla |
| 2009/0170634 A1 | 7/2009 | Loper |
| 2009/0227394 A1 | 9/2009 | Bulpett et al. |
| 2010/0004069 A1 | 1/2010 | Hebert et al. |
| 2010/0048327 A1 | 2/2010 | Bulpett et al. |
| 2010/0099514 A1 | 4/2010 | Sullivan |
| 2010/0304893 A1 | 12/2010 | De Garavilla |
| 2011/0098134 A1 | 4/2011 | Sullivan et al. |
| 2011/0244988 A1 | 10/2011 | Sullivan et al. |
| 2011/0256962 A1 | 10/2011 | Sullivan et al. |
| 2011/0300969 A1 | 12/2011 | Sullivan et al. |
| 2011/0300970 A1 | 12/2011 | Sullivan et al. |
| 2011/0312442 A1 | 12/2011 | Sullivan |
| 2015/0031475 A1 | 1/2015 | Sullivan et al. |
| 2015/0099596 A1 | 4/2015 | Sullivan et al. |
| 2015/0111668 A1 | 4/2015 | Sullivan et al. |
| 2015/0190680 A1 | 7/2015 | Bulpett et al. |
| 2016/0184656 A1 | 6/2016 | Shigemitsu |

* cited by examiner

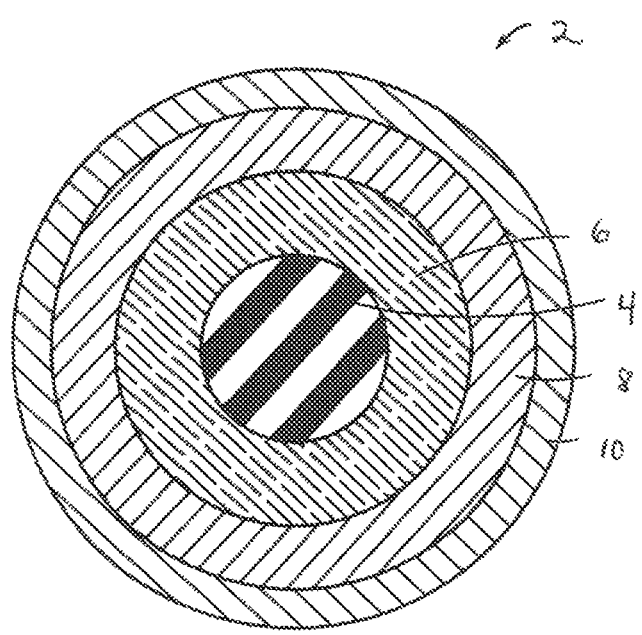

US 10,150,011 B2

GOLF BALL INCORPORATING AT LEAST THREE ADJACENT IONOMERIC AND/OR HNP-BASED LAYERS HAVING MULTIPLE RELATED PROPERTY GRADIENTS THERE BETWEEN

FIELD OF THE INVENTION

Golf balls composed entirely of ionomeric and/or HNP-based layers.

BACKGROUND OF THE INVENTION

Golf balls are made in a variety of constructions and compositions. Golf balls, whether of solid or wound construction, generally include a core and at least a cover and/or outer coating. The core and/or cover can have multiple layers, such as a dual core having a solid center and an outer core layer, or a "dual cover" having an inner and outer cover layer.

Examples of golf ball materials range from rubber materials, such as balata, styrene butadiene, polybutadiene, or polyisoprene, to thermoplastic or thermoset resins such as ionomers, polyolefins, polyamides, polyesters, polyurethanes, polyureas and/or polyurethane/polyurea hybrids.

Typically, outer layers are formed about the spherical outer surface of an innermost golf ball layer via compression molding, casting, or injection molding. Cores are generally made using techniques such as compression or injection molding. For example, a center may be formed by compression molding a slug of uncured core material into a spherical structure. Meanwhile, outer core layers may be formed over the center by compression or injection molding techniques. In turn, the intermediate and/or cover layers are applied.

Suitable techniques for forming cover layer(s) over the core or intermediate layer (collectively referred to herein as "ball subassembly") include, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. In a compression molding process, hemispherical shells are generally placed about the subassembly in a compression mold and fused together under sufficient heat and pressure. In contrast, with an injection molding process, cover material is injected about and directly onto the subassembly using retractable pins, for example.

When a cover layer is formed by a casting process, liquid cover material is poured into lower and upper mold cavities, into which a subassembly is lowered at a controlled speed. The subassembly is held in place via partial vacuum to the point of sufficient gelling, and then the upper mold cavity is mated with the lower mold cavity under sufficient pressure and heat followed by cooling the unit until it can be handled without deformation.

And playing characteristics of golf balls, such as spin, feel, CoR and compression can be tailored by varying the properties of the golf ball materials and/or adding additional golf ball layers such as at least one intermediate layer disposed between the cover and the core. Intermediate layers can be of solid construction, and have also been formed of a tensioned elastomeric winding. The difference in play characteristics resulting from these different types of constructions can be quite significant.

Ionomers became popular golf ball cover materials due to their excellent impact resistance and their thermaplasticity, which permits the material to be economically applied via injection or compression molding techniques. Ionomers, particularly ethylene-based ionomers, are a desirable group of polymers for golf ball layers because of their toughness, durability, and wide range of hardness values. Further, golf balls incorporating fatty acid neutralized acid polymers are generally known for achieving desirable golf ball properties relating for example to spin, feel, and CoR.

The benefits and cost effectiveness of ionomeric/highly neutralized polymer ("HNP") materials have therefore prompted some golf ball manufacturers to try producing golf balls with ionomers/HNPs in all layers. In this regard, U.S. Publ. No. 2006/0166759 of Kennedy III, et al. suggests incorporating a thermoplastic material such as an ionomeric composition or a highly neutralized blend "in at least one" of the core, cover or a boundary layer. Id. at ABSTRACT. Then, in U.S. Publ. No. 2006/0211518 of Sullivan et al., golf balls are disclosed having three or more adjacent layers wherein each layer contains an ionomeric/HNP material and a "percent neutralization gradient" either increases or decreases from innermost layer outward.

However, to date, golf ball manufacturers have not commercially pursued golf balls containing ionomeric/HNP compositions/materials in every layer—largely because resulting golf balls having sufficient resilience meanwhile have an undesirably hard feel. There is therefore a need for resilient golf balls containing ionomeric/HNP compositions/materials in every layer without the hard feel of prior golf balls. Golf balls of the present invention and the methods of making same address and solve this need.

SUMMARY OF THE INVENTION

Accordingly, a golf ball of the invention has at least three layers comprising ionomeric compositions (including conventional ionomeric and/or HNP compositions), wherein for each two adjacent layers, a relationship is established between a ratio of the volumes of the two adjacent layers and a ratio of the percent neutralizations of those two layers such that the volumes and % neutralizations of all layers are interrelated and interdependent to produce unique and desirable playing characteristics. In one embodiment, a golf ball of the invention has T layers, wherein T≥3 and each of T layers has a different volume "V" and comprises an ionomeric or HNP composition having a different % neutralization "N". Furthermore, each of n inner layers of the T layers (n<T) has an adjacent surrounding layer n+1 such that a volume $V_n$ and a % neutralization $N_n$ of each inner layer and a volume $V_{(n+1)}$ and % neutralization $N_{(n+1)}$ of each adjacent surrounding layer n+1 satisfy the relationship $(V_n-V_{(n+1)})/V_n \geq (N_n-N_{(n+1)})/N_{(n+1)}$.

In one particular embodiment, T=3 and n=2, and the n inner layers include a first layer surrounded by an adjacent second layer. The first layer may have a first volume $V_1$; the second layer may have a second volume $V_2$; and a third layer may have a third volume $V_3$; wherein $V_3 < V_2 < V_1$.

Furthermore, N for the ionomeric and/or HNP composition of first layer may be 90 or greater; N for the ionomeric and/or HNP composition of the second layer may be from 50 to 90; and N for the ionomeric and/or HNP composition of the third layer may be less than 50.

However, the specific V and N selected for each of the T=3 layers must meanwhile also satisfy the relationship $(V_n-V_{(n+1)})/V_n \geq (N_n-N_{(n+1)})/N_{(n+1)}$ for the golf ball.

In one embodiment, the first layer may have a first outer diameter $OD_1$; the second layer may have a second outer diameter $OD_2$; and the layer may have a third outer diameter $OD_3$; wherein $OD_3 > OD_2 > OD_1$ and $OD_1$ is about 1.55 inches or less, and $OD_2$ is up to about 1.64 inches. And in one specific embodiment, $OD_1$ is about 1.53 inches, $OD_2$ is about 1.62 inches; and $OD_3$ is about 1.683 inches.

Meanwhile, the first layer may have a first outer surface comprising a first outer surface hardness of at least 30 Shore D; the second inner layer may have a second outer surface comprising a second outer surface hardness of at least 60 Shore D; and the outermost layer may have a third outer surface comprising a third outer surface hardness of less than 65 Shore D.

In another particular embodiment of a golf ball of the invention, T=4 and n=3, and the n inner layers include a first layer surround by an adjacent second layer, which is surrounded by an adjacent third layer.

The first layer may have a first volume $V_1$; the second layer may have a second volume $V_2$; the third layer may have a third volume $V_3$, and a fourth layer may have a fourth volume $V_4$; wherein $V_4 < V_3 < V_2 < V_1$.

Furthermore, N for the ionomeric and/or HNP composition of first layer is 90 or greater; N for the ionomeric and/or HNP composition of the second layer is from 70 to 90; N for the ionomeric and/or HNP composition of the third layer is from 50 to 75; and N for the ionomeric and/or HNP composition of the fourth layer may be less than 55.

Once again, the specific V and N selected for each of the T=4 layers must meanwhile also satisfy the relationship $(V_n - V_{(n+1)})/V_n \geq (N_n - N_{(n+1)})/N_{(n+1)}$ for the golf ball.

In one embodiment, the first layer may have a first outer diameter $OD_1$; the second layer may have a second outer diameter $OD_2$; the third layer may have a third outer diameter $OD_3$; and the fourth layer may have a fourth outer diameter $OD_4$; wherein $OD_4 > OD_3 > OD_2 > OD_1$ and $OD_1$ is about 1.3 inches or less, $OD_2$ is up to about 1.55 inches; and $OD_3$ is up to about 1.64 inches. And in one specific embodiment, $OD_1$ is about 1.25 inches, $OD_2$ is about 1.51 inches; $OD_3$ is about 1.62 inches; and $OD_4$ is about 1.683 inches.

Meanwhile, the first layer may have a first outer surface comprising a first outer surface hardness of 20 Shore D or greater; the second layer may have a second outer surface comprising a second outer surface hardness of at least 40 Shore D; the third layer may have a third outer surface comprising a third outer surface hardness of at least 60 Shore D; and the fourth layer may have a fourth outer surface comprising a fourth outer surface hardness of 65 Shore D or less.

And for each of the embodiments disclosed herein and their equivalents, at least two adjacent layers of the T layers may have uniform thicknesses, and with inner and outer surfaces that are each non-planar. Alternatively, at least two adjacent layers of the T layers may have non-uniform thicknesses. For example, in one particular embodiment, the at least two adjacent layers may have non-planar surfaces at an interface between the at least two adjacent layers. In other embodiments, the non-planar surfaces of the at least two adjacent layers may be located at surfaces of each layer other than at the interface.

The invention is also directed to a method of making a golf ball having T layers, wherein $T \geq 3$ and each of T layers comprises an ionomeric and/or HNP composition, comprising the steps of: providing a first layer comprising an ionomeric and/or HNP composition; forming a second layer comprising an ionomeric and/or HNP composition about the first layer; and forming at least one other layer comprising an ionomeric and/or HNP composition about the second layer; wherein each of T layers has a different volume V, and wherein each of the ionomeric and/or HNP compositions of each of T layers has a different % neutralization N; and wherein each of n inner layers of the T layers (n<T) has an adjacent surrounding layer n+1 such that a volume $V_n$ and a % neutralization $N_n$ of each inner layer and a volume $V_{(n+1)}$ and % neutralization $N_{(n+1)}$ of each adjacent surrounding layer n+1 satisfy the relationship $(V_n - V_{(n+1)})/V_n \geq (N_n - N_{(n+1)})/N_{(n+1)}$.

BRIEF DESCRIPTION OF THE DRAWINGS

FIG. 1 is a schematic cross section illustrating one embodiment of a golf ball of the present invention.

DETAILED DESCRIPTION

In a golf ball of the invention having at least three adjacent layers comprising ionomeric and/or HNP compositions, the relationship $(V_n - V_{(n+1)})/V_n \geq (N_n - N_{(n+1)})/N_{(n+1)}$ exists between each two adjacent layers. The relationship is between a ratio of the volumes of the two adjacent layers and a ratio of the % neutralizations of the materials of those two adjacent layers. Through this relationship, the volumes and % neutralizations of all layers are interrelated and interdependent so as to produce unique desirable playing characteristics.

Accordingly, a golf ball of the invention comprises at least three layers comprising ionomeric and/or HNP compositions, wherein for each two adjacent layers there is a relationship between a ratio of the volumes of the two adjacent layers and a ratio of the percent neutralizations of those two layers such that the volumes and % neutralizations of all layers are interrelated and interdependent to produce unique and desirable playing characteristics. In one embodiment, a golf ball of the invention has T layers, wherein $T \geq 3$ and each of the T layers has a different volume "V" and comprises an ionomeric and/or HNP composition having a different % neutralization "N". Furthermore, each inner layer n of the T layers (n<T) has an adjacent surrounding layer n+1 such that a volume $V_n$ and a % neutralization $N_n$ of each inner layer and a volume $V_{(n+1)}$ and % neutralization $N_{(n+1)}$ of each adjacent surrounding layer n+1 satisfy the relationship $(V_n - V_{(n+1)})/V_n \geq (N_n - N_{(n+1)})/N_{(n+1)}$.

As used herein, "percent (%) neutralization" is a description of the extent of neutralization of a layer comprising an ionomeric and/or HNP composition. In this regard, ionomers and HNPs are classifications of acid polymers according to the percent of acid groups thereof that are neutralized.

The following prophetic example illustrates one embodiment of a golf ball of the invention:

Example I

Consider a golf ball of the invention wherein T=3 (center, intermediate layer and cover) and $V_3 < V_2 < V_1$. The center has first outer diameter $OD_1$; the intermediate layer has second outer diameter $OD_2$; and the cover has third outer diameter $OD_3$; wherein $OD_3 > OD_2 > OD_1$ and $OD_1$ is about 1.53 inches, $OD_2$ is about 1.62 inches; and $OD_3$ is about 1.683 inches. Also in this embodiment, $N_1$ for the ionomeric or HNP composition of the center is equal to or greater than 90; $N_2$ for the ionomeric or HNP composition of the intermediate layer is from 50 to 90; and N for the ionomeric or HNP composition of the cover is less than 50.

Using the relationship $(V_n - V_{(n+1)})/V_n \geq (N_n - N_{(n+1)})/N_{(n+1)}$, it is possible to confirm the values $V_1$, $V_2$, $V_3$ from the diameters $OD_1$, $OD_2$, $OD_3$ provided above, for which numerous suitable % neutralization $N_1$, $N_2$, $N_3$ can be selected depending on the desired golf ball playing characteristics. Specifically, knowing that the center is spherical, volume $V_1$ may be derived using the equation $V_1 4/3\pi r^3$. Solving this equation:

$$V_1 = 4/3\pi r^3$$
$$= 4/3\pi (OD_1/2)^3$$
$$= 4/3\pi (0.765)^3$$
$$= 1.8753 \; cu. \; in.$$

In turn, volume $V_2$ of the intermediate layer can be determined by first calculating a spherical volume Vs for the intermediate layer using outer diameter $OD_2$ of the intermediate layer, and then subtracting volume $V_1$ therefrom:

$$Vs = 4/3\pi r^3$$
$$= 4/3\pi (0.81)^3$$
$$= 2.2261 \; cu. \; in.$$

(and)

$$V_2 = Vs - V_1$$
$$= (2.2261 - 1.8753)(cu. \; in.)$$
$$= 0.3508 \; cu. \; in.$$

Similarly, $V_3$ can be determined by first calculating yet another a spherical volume Vs for the cover layer using $Vs=4/3\pi(r)^3$ and this time subtracting therefrom a sum of the volumes $V_1$ and $V_2$: $V_3=Vs-(V_1+V_2)$. In this fashion, $$Vs = 4/3\pi r^3$$
$$= 4/3\pi (0.8415)^3$$
$$= 2.4960 \; cu. \; in.$$

(and)

$$V_3 = Vs - (V_1 + V_2)$$
$$= (2.4960 - (1.8753 + 0.3508)(cu. \; in.)$$
$$= (2.4960 - 2.2261)(cu. \; in.)$$
$$= 0.2699 \; cu. \; in.$$

From these above-confirmed volume choices for each of the center, intermediate layer and cover, one of a plurality of suitable % neutralizations $N_1$, $N_2$, $N_3$ can be selected which satisfy the relationship $(V_n-V_{(n+1)})/V_n \geq (N_n-N_{(n+1)})/N_{(n+1)}$. For example, $N_1$, $N_2$ and $N_3$ for the center, intermediate layer and cover in one embodiment can be N1=95; N2=55; and N3=45, satisfying $(V_n-V_{(n+1)})/V_n \geq (N_n-N_{(n+1)})/N_{(n+1)}$ as follows:

$$((V_1-V_2)/V_1) \geq ((N_1-N_2)/N_2) \; or$$

$$((1.8753-0.3508)/1.8753) \geq ((95-55)/55)$$

$$0.8129 \geq 0.7272$$

(and)

$$((V_2-V_3)/V_2) \geq ((N_2-N_3)/N_3) \; or$$

$$((0.3508-0.2699)/0.3508) \geq ((55-45)/45)$$

$$0.2306 \geq 0.2222$$

Several non-limiting possible alternative values for $N_1$, $N_2$, $N_3$ in the particular golf ball construction of EXAMPLE I include: (a) $N_1$=90, $N_2$=50, and $N_3$=41; (b) $N_1$=92, $N_2$=51, and $N_3$=42; (c) $N_1$=93, $N_2$=57, and $N_3$=47; (d) $N_1$=94, $N_2$=53, and $N_3$=46; (e) $N_1$=97, $N_2$=54, and $N_3$=48; (f) $N_1$=98, $N_2$=55, and $N_3$=45; (g) $N_1$=99, $N_2$=60, and $N_3$=49. In this regard, TABLE I below demonstrates that for each of these alternative values, $(N_2-N_1)/N_1$ and $(N_3-N_2)/N_2$ do indeed satisfy the relationship $(V_n-V_{(n+1)})/V_n \geq (N_n-N_{(n+1)})/N_{(n+1)}$ when compared with $(V_1-V_2)/V_1$ and $((V_2-V_3)/V_2)$ above:

TABLE I

| EXAMPLE | $(N_1 - N_2)/N_2$ | $(N_2 - N_3)/N_3$ |
|---------|-------------------|-------------------|
| (a) | 0.8 | 0.2195 |
| (b) | 0.8039 | 0.2143 |
| (c) | 0.6316 | 0.2128 |
| (d) | 0.7736 | 0.1522 |
| (e) | 0.7963 | 0.1250 |
| (f) | 0.7818 | 0.2222 |
| (g) | 0.65 | 0.2245 |

In a different embodiment, $OD_1$ may be for example about 1.55 inches or less, while $OD_2$ may be up to about 1.64 inches, and with $OD_3$ being adjusted accordingly so as to satisfy the relationship $(V_n-V_{(n+1)})/V_n \geq (N_n-N_{(n+1)})/N_{(n+1)}$ for each of the center and intermediate layer.

While the golf balls of EXAMPLE I above are discussed based upon first selecting diameters $OD_1$, $OD_2$, $OD_3$, embodiments are also envisioned wherein $N_1$, $N_2$, and $N_3$ are targeted first, followed by selecting diameters $OD_1$, $OD_2$, $OD_3$ and therefore volumes $V_1$, $V_2$, $V_2$ which satisfy the relationship $(V_n-V_{(n+1)})/V_n \geq (N_n-N_{(n+1)})/N_{(n+1)}$. Furthermore, it should be understood that the range of suitable values $N_1$, $N_2$, $N_3$, . . . , $N_T$ may vary as the values $OD_1$, $OD_2$, $OD_3$, . . . , $OD_T$ (and therefore $V_1$, $V_2$, $V_2$, . . . , $V_T$) are changed to achieve a particular playing characteristic.

Meanwhile, the hardnesses of the layers may be targeted and coordinated to achieve different playing characteristics. For example, in the example detailed above, the first layer may have a first outer surface comprising a first outer surface hardness of at least 30 Shore D; with the second layer having a second outer surface comprising a second outer surface hardness of at least 60 Shore D; and the third layer having a third outer surface comprising a third outer surface hardness of less than 65 Shore D.

In another particular embodiment of a golf ball of the invention, T=4 and n=3, and the n inner layers include a first layer, surround by an adjacent second layer, which is in turn surrounded by an adjacent third layer. The first layer may have a first volume $V_1$; the second layer may have a second volume $V_2$; the third layer may have a third volume $V_3$, and a fourth layer may have a fourth volume $V_4$; wherein $V_4<V_3<V_2<V_1$. Furthermore, N for the ionomeric and/or HNP composition of first layer may be 55 or less; N for the ionomeric and/or HNP composition of the second layer may be between 50 and 75; and N for the ionomeric and/or HNP composition of the third layer may be between 70 and 90. And in one embodiment, N for the ionomeric and/or HNP composition of the fourth layer of the golf ball is greater than 90.

Once again, the specific V and N selected for each of the T=4 layers must meanwhile also satisfy the relationship $(V_n-V_{(n+1)})/V_n \geq (N_n-N_{(n+1)})/N_{(n+1)}$ for the golf ball.

Referring to FIG. 1, in one embodiment, a golf ball of the invention is a four piece golf ball 2, having an inner core layer 4; surrounded by an outer core layer (or intermediate layer) 6; surrounded by an inner cover 8; surrounded by an outer cover 10. Inner core layer 4 has the first volume $V_1$, outer core layer (or intermediate layer) 6 has the second volume $V_2$, inner cover 8 has the third volume $V_3$, and outer cover 10 has the fourth volume $V_4$ which are related as further defined herein.

In one construction of this particular embodiment, the first layer may have a first outer diameter $OD_1$; the second layer may have a second outer diameter $OD_2$; the third layer may have a third outer diameter $OD_3$; and the fourth layer may have a fourth outer diameter $OD_4$; wherein $OD_4 > OD_3 > OD_2 > OD_1$ and $OD_1$ is about 1.3 inches or less, $OD_2$ is up to about 1.55 inches; and $OD_3$ is up to about 1.64 inches. And in one specific construction, $OD_1$ is about 1.25 inches, $OD_2$ is about 1.51 inches; OD is about 1.62 inches; and $OD_4$ is about 1.683 inches.

Additionally, the first layer may have a first outer surface comprising a first outer surface hardness of 20 Shore D or greater; the second layer may have a second outer surface comprising a second outer surface hardness of at least 40 Shore D; the third layer may have a third outer surface comprising a third outer surface hardness of at least 60 Shore D; and the fourth layer may have a fourth outer surface comprising a fourth outer surface hardness of 65 Shore D or less.

And for each of the embodiments disclosed herein and their equivalents, at least two adjacent layers of the T layers may have uniform thicknesses, and with inner and outer surfaces that are each non-planar. Alternatively, at least two adjacent layers of the T layers may have non-uniform thicknesses. For example, in one particular embodiment, the at least two adjacent layers may have non-planar surfaces at an interface between the at least two adjacent layers. In other embodiments, the non-planar surfaces of the at least two adjacent layers may be located at surfaces of each layer other than at the interface.

In one method of the invention for making a golf ball having T layers, T should be ≥3 and each of T layers should be formed to comprise at least one of an ionomeric and/or HNP composition by: providing a first layer comprising an ionomeric and/or HNP composition; forming a second layer comprising an ionomeric and/or HNP composition about the first layer; and forming an ionomeric or HNP composition about the second layer; wherein each of T layers has a different volume V, and wherein each of the ionomeric and/or HNP compositions of each of T layers has a different % neutralization N; and wherein each of n inner layers of the T layers (n<T) has an adjacent surrounding layer n+1 such that a volume $V_n$ and a % neutralization $N_n$ of each inner layer and a volume $V_{(n+1)}$ and % neutralization $N_{(n+1)}$ of each adjacent surrounding layer n+1 satisfy the relationship $(V_n - V_{(n+1)})/V_n \geq (N_{(n+1)} - N_n)/N_n$.

Methods for making a golf ball of the invention may include initially selecting the volumes for each layer, followed by selecting N for each layer based on the relationship $(V_n - V_{(n+1)})/V_n \geq (N_{(n+1)} - N_n)/N_n$. In another embodiment, N can be selected for each layer first, followed by selecting layer volumes based on the $(V_n - V_{(n+1)})/V_n \geq (N_{(n+1)} - N_n)/N_n$. In yet other embodiments, V and N can be selected for one or more layers followed by selecting V and N for the balance of the desired number of layers.

It is envisioned that a golf ball of the invention may have any conceivable shape and outer diameter, although the United States Golf Association (USGA) specifies that a golf ball must be spherical in shape and be no less than 1.68-inches (42.7 mm) in diameter. Every layer of a golf ball of the invention comprises an ionomeric material (conventional ionomer and/or HNP), and the volumes of each layer and the % neutralizations of the ionomeric material of each layer must be selected/targeted so that the relationship identified above is satisfied, even with respect to the outermost golf ball layer. In some embodiments, at least one layer of the golf ball may include ingredients in addition to ionomer(s) and/or HNP(s). In other embodiments, at least one layer of the golf ball may consist entirely of ionomer(s) and/or HNP(s).

In some embodiments, coating layers, paint layers, and/or tie-layers are not considered layers for purposes of defining adjacent layers and satisfying the relationship defined herein. Of course, embodiments are envisioned however wherein any or all of coating layers, paint layers, and/or tie-layers may indeed be considered layers for purposes of defining adjacent layers and satisfying the relationship.

Preselecting the volume and/or % neutralization of a particular layer thereby limits/restricts the range of possible volumes and % neutralizations for all other layers to values which satisfy the relationship $(V_n - V_{(n+1)})/V_n \geq (N_n - N_{(n+1)})/N_{(n+1)}$. Thus, for example, selecting the volume for the innermost layer thereby limits the range of possibilities for the volumes for all outer layers as well as limits the range of possibilities for the % neutralization in all layers to those values which can satisfy the relationship set forth above for each two adjacent layers. Likewise, selecting the volume as well as % neutralization in for the innermost layer thereby even further limits the range of possibilities for the volumes and % neutralization for all remaining layers to those values which can satisfy the relationship set forth above for each two adjacent layers.

Embodiments are also envisioned wherein the volume and/or % neutralization is preselected for an outer layer first, so that the volumes and % neutralizations for an adjacent inner layer must be then selected within a range that satisfies the relationship $(V_n - V_{(n+1)})/V_n \geq (N_n - N_{(n+1)})/N_{(n+1)}$ in view of the values already selected/targeted for the adjacent outer layer.

And, in some embodiments/golf ball constructions, the volume side of the relationship may be defined initially, followed by selecting the % neutralizations of each layer in view of the volume ratio resulting from the volumes selected for each two adjacent layers. In other embodiments, the % neutralization side of the relationship may be defined initially, followed by selecting the volumes for each two adjacent layers based on the values targeted selected for % neutralization of the material of each layer.

It is understood that the neutralization levels for the ionomeric materials of each layer should be targeted to satisfy the relationship $(V_n - V_{(n+1)})/V_n \geq (N_n - N_{(n+1)})/N_{(n+1)}$ in view of the respective volumes of each layer notwithstanding conventional classifications for the ionomeric composition/material. Suitable ionomeric materials for a particular layer may in fact include ionomeric compositions from more than one conventional classification, for example where the ionomeric and/or HNP composition is a blend.

In this regard, ionomeric compositions are conventionally classified by the degree to which acid groups of the acid copolymer ingredient are neutralized—generally being categorized as highly-neutralized polymers (HNPs); partially-neutralized acid polymers; or lowly-neutralized acid polymers, or blends thereof. Lowly-neutralized compositions, for example, typically include acid copolymers having 0% to less than 20% neutralization levels. In other embodiments, 1 to 19%, or about 3% to about 18%, or about 6% to about 15% of the acid groups are neutralized. Meanwhile, partially-neutralized compositions typically have 20% to less than 70% of the acid groups being neutralized.

And HNPs comprise an acid copolymer with at least 70%, preferably at least 80%, more preferably at least 90%, more preferably at least 95%, and even more preferably 100%, of all acid groups present being neutralized. In some embodiments, greater than 100%, or 105% or greater, or 110% or greater, or 115% or greater, or 120% or greater, or 125% or greater, or 200% or greater, or 250% or greater of all acid groups present in the composition may be neutralized.

It is also recognized that acid copolymer blends may be prepared including, but not limited to, acid copolymer compositions formed from: i) blends of two or more partially-neutralized ionomers; ii) blends of two or more highly-neutralized ionomers; iii) blends of two or more non-neutralized acid copolymers and/or lowly-neutralized ionomers; iv) blends of one or more highly-neutralized ionomers with one or more partially-neutralized ionomers, and/or lowly-neutralized ionomers, and/or non-neutralized acid copolymers; v) blends of partially-neutralized ionomers with one or more highly-neutralized ionomers, and/or lowly-neutralized ionomers, and/or non-neutralized acid copolymers.

With such blends of ionomers/HNPs, for purposes of satisfying the relationship $(V_n - V_{(n+1)})/V_n \geq (N_n - N_{(n+1)})/N_{(n+1)}$, the % neutralization for the blend is an average of the % neutralizations of the various ionomers/HNPs included in the blend, with appropriate weight being given to each based on their relative amounts (e.g. wt. %) included in the blend. For example, the ionomeric composition may contain a 50/50 wt. % blend of two different highly-neutralized ethylene/methacrylic acid copolymers, a first having acid groups that are 80% neutralized, and a second having acid groups that are 110% neutralized. In this example, the % neutralization of the blend is (80+110)%/2 or 95%.

In another version, the composition may contain a 20/80 wt % blend of a lowly-neutralized ionomeric composition and an HNP, a first having acid groups that are 15% neutralized, and a second having acid groups that are 85% neutralized. In this example, the % neutralization of the blend is (15×(0.20))+(85×(0.80))/% or (3+68)% or 71%.

In yet another version, the composition contains a 30/70 wt. % blend of a partially-neutralized composition and an HNP, a first having acid groups that are 60% neutralized, and a second having acid groups that are 150% neutralized. In this example, the % neutralization of the blend is (60×(0.30))+(150×(0.70))% or (18+105)% or 128%.

In still another version, the composition contains a 75/25 wt. % blend of a partially-neutralized composition and a lowly-neutralized composition, a first having acid groups that are 60% neutralized, and a second having acid groups that are 12% neutralized. In this example, the % neutralization of the blend is (60×(0.75))+(12×(0.25))% or (45+3)% or 48%. Of course, numerous other examples are possible.

Suitable acid copolymers include, for example, ethylene acid copolymers, generally referred to as copolymers of ethylene; $C_3$ to $C_8$ α, β-ethylenically unsaturated mono- or dicarboxylic acid; and optional softening monomer. Copolymers may include, without limitation, ethylene acid copolymers, such as ethylene/(meth)acrylic acid, ethylene/(meth) acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth) acrylate, ethylene/(meth)acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

When a softening monomer is included, such copolymers are referred to herein as E/X/Y-type copolymers, wherein E is ethylene; X is a $C_3$ to $C_8$ α, β-ethylenically unsaturated mono- or dicarboxylic acid; and Y is a softening monomer. The softening monomer is typically an alkyl (meth) acrylate, wherein the alkyl groups have from 1 to 8 carbon atoms. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α, β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The acidic groups in the copolymeric ionomers are partially or totally neutralized with a cation source. Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. The metal cation salts provide the cations capable of neutralizing (at varying levels) the carboxylic acids of the ethylene acid copolymer and fatty acids, if present, as discussed further below. These include, for example, the sulfate, carbonate, acetate, oxide, or hydroxide salts of lithium, sodium, potassium, magnesium, calcium, barium, lead, tin, zinc, aluminum, manganese, nickel, chromium, copper, or a combination thereof. Preferred metal cation salts are calcium and magnesium-based salts. High surface area cation particles such as micro and nano-scale cation particles are preferred. The amount of cation used in the composition is readily determined based on desired level of neutralization.

Different materials can be used as the neutralizing agent. For example, the neutralizing agent can be a metal cation salt, wherein the metal cation is selected preferably from Zn, Na, Li, K, Ca, Mg, Ni, Mn, Cu, Ti, and Al, and mixtures thereof. More preferably, Ca or Mg cations are used in the composition. In one preferred version, the first ionomer composition does not contain a fatty acid or salt thereof, while the second ionomer composition does contain a fatty acid or salt thereof. The fatty acid is selected preferably from the group of stearic acid, behenic acid, erucic acid, oleic acid, linoleic acid, and dimerized derivatives, and mixtures thereof. More preferably, behenic acid or erucic acid is used in the composition.

In the present invention, "ionic plasticizers" such as organic acids or salts of organic acids, particularly fatty acids, may optionally be added to the ionomer resin. Such ionic plasticizers are used to make conventional ionomer composition more processable as described in Rajagopalan et al., U.S. Pat. No. 6,756,436, the entire disclosure of which is hereby incorporated herein by reference. In the present invention such ionic plasticizers are optional. In one preferred embodiment, the ionomer composition, containing acid groups neutralized to 70% or less, does not include a fatty acid or salt thereof, or any other ionic plasticizer. On the other hand, the ionomer composition, containing acid groups neutralized to greater than 70%, may include an ionic plasticizer, particularly a fatty acid or salt thereof. For example, the ionic plasticizer may be added in an amount of 0.5 to 10 pph, more preferably 1 to 5 pph. The organic acids may be aliphatic, mono- or multi-functional (saturated, unsaturated, or multi-unsaturated) organic acids. Salts of these organic acids may also be employed. Suitable fatty acid salts include, for example, metal stearates, laureates, oleates, palmitates, pelargonates, and the like. For example, fatty acid salts such as zinc stearate, calcium stearate, magnesium stearate, barium stearate, and the like can be used. The salts of fatty acids are generally fatty acids neutralized with metal ions. The metal cation salts provide the cations capable of neutralizing (at varying levels) the carboxylic acid groups of the fatty acids. Examples include the sulfate, carbonate, acetate and hydroxide salts of metals such as barium, lithium, sodium, zinc, bismuth, chromium, cobalt, copper, potassium, strontium, titanium, tungsten, magnesium, cesium, iron, nickel, silver, aluminum, tin, or calcium, and blends thereof. It is preferred the organic acids and salts be relatively non-migratory (they do not bloom to the surface of the polymer under ambient temperatures) and non-volatile (they do not volatilize at temperatures required for melt-blending).

Ionomeric compositions may contain additional materials such as, for example, a small amount of ionic plasticizer, which is particularly effective at improving the processability of highly-neutralized ionomers. For example, the ionic plasticizer may be added in an amount of 0.5 to 10 pph, more preferably 1 to 5 pph. In addition to the fatty acids and salts of fatty acids discussed above, other suitable ionic plasticizers include, for example, polyethylene glycols, waxes, bis-stearamides, minerals, and phthalates. In another embodiment, an amine or pyridine compound is used, preferably in addition to a metal cation. Suitable examples include, for example, ethylamine, methylamine, diethylamine, tert-butylamine, dodecylamine, and the like.

Fillers, fibers, flakes also may be included in the ionomeric composition. Particularly preferred additives of this nature include, but are not limited to, very-high-surface-area fillers that have an affinity for the acid groups in ionomer. In particular, fillers, fibers or flakes having cationic nature such that they may also contribute to the neutralization of the ionomer are suitable. Aluminum oxide comprising fillers are preferred. Also, silica, fumed silica, or precipitated silica, such as those sold under the tradename HISIL from PPG Industries, or carbon black. Nano-scale materials are also preferred and include, but are not limited to, nanotubes, nanoflakes, nanofillers, or nanoclays.

Other additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, tungsten, tungsten carbide, silica, lead silicate, regrind (recycled material), clay, mica, talc, nano-fillers, carbon black, glass flake, milled glass, and mixtures thereof. Suitable additives are more fully described in, for example, Rajagopalan et al., U.S. Patent Application Publication No. 2003/0225197, the entire disclosure of which is hereby incorporated herein by reference. In a particular embodiment, the total amount of additive(s) and filler(s) present in the ionomeric composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the ionomeric composition. In a particular aspect of this embodiment, the ionomeric composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the ionomeric composition is modified with organic fiber micropulp, as disclosed, for example, in Chen, U.S. Pat. No. 7,504,448, the entire disclosure of which is hereby incorporated herein by reference. In another version, the ionomer compositions may contain carbon fibers or carbon fiber sheets comprising a weave of thin carbon fibers held together in a resin. In yet another version, the ionomer compositions may contain forged composite material composed of bundles of microscopic carbon fibers held together in a resin. These turbostratic carbon fibers are randomly dispersed in the resin. The structure of the forged composite material differs over traditional carbon fiber sheets. The forged composite material contains discontinuous fibers intertwined in the resin; while ordinary carbon fiber sheets are woven—they contain a weave of fibers. As a result, the forged composite material is very lightweight and has high mechanical strength.

Other suitable thermoplastic polymers that may be included in the ionomer compositions include, but are not limited to, the following polymers (including homopolymers, copolymers, and derivatives thereof.)

(a) polyesters, particularly those modified with a compatibilizing group such as sulfonate or phosphonate, including modified poly(ethylene terephthalate), modified poly (butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof;

(b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof;

(c) polyurethanes, polyureas, polyurethane-polyurea hybrids, and blends of two or more thereof;

(d) fluoropolymers, such as those disclosed in U.S. Pat. Nos. 5,691,066, 6,747,110 and 7,009,002, the entire disclosures of which are hereby incorporated herein by reference, and blends of two or more thereof;

(e) polystyrenes, such as poly(styrene-co-maleic anhydride), acrylonitrile-butadiene-styrene, poly(styrene sulfonate), polyethylene styrene, and blends of two or more thereof;

(f) polyvinyl chlorides and grafted polyvinyl chlorides, and blends of two or more thereof;

(g) polycarbonates, blends of polycarbonate/acrylonitrile-butadiene-styrene, blends of polycarbonate/polyurethane, blends of polycarbonate/polyester, and blends of two or more thereof;

(h) polyethers, such as polyarylene ethers, polyphenylene oxides, block copolymers of alkenyl aromatics with vinyl aromatics and polyamicesters, and blends of two or more thereof;

(i) polyimides, polyetherketones, polyamideimides, and blends of two or more thereof; and (j) polycarbonate/polyester copolymers and blends.

Furthermore, the resulting ionomer compositions may contain natural and synthetic rubbers such as, for example, polybutadiene, polyisoprene, ethylene propylene rubber (EPR), ethylene propylene diene rubber (EPDM), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, and polystyrene elastomers.

In some embodiments, preferred acid polymers are copolymers of an α-olefin and a $C_3$-$C_8$ α,β-ethylenically unsaturated carboxylic acid, optionally including a softening monomer. The α-olefin is preferably selected from ethylene and propylene. The acid is preferably selected from (meth) acrylic acid, ethacrylic acid, maleic acid, crotonic acid, fumaric acid, and itaconic acid. (Meth) acrylic acid is particularly preferred. The optional softening monomer is preferably selected from alkyl (meth) acrylate, wherein the alkyl groups have from 1 to 8 carbon atoms. Preferred acid polymers include, but are not limited to, those wherein the α-olefin is ethylene, the acid is (meth) acrylic acid, and the optional softening monomer is selected from (meth) acrylate, n-butyl (meth) acrylate, isobutyl (meth) acrylate, methyl (meth) acrylate, and ethyl (meth) acrylate. Particularly preferred acid polymers include, but are not limited to, ethylene/(meth) acrylic acid/n-butyl acrylate, ethylene/(meth) acrylic acid/methyl acrylate, and ethylene/(meth) acrylic acid/ethyl acrylate.

Suitable acid polymers for forming the HNP also include acid polymers that are already partially neutralized. Examples of suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from ExxonMobil Chemical Company. Also suitable are DuPont® HPF 1000 and DuPont® HPF 2000, ionomeric materials commercially available from E. I. du Pont de Nemours and Company. In some embodiments, very low modulus ionomer- ("VLMI-") type ethylene-acid polymers are particularly suitable for forming the HNP, such as Surlyn® 6320, Surlyn® 8120, Surlyn® 8320, and Surlyn® 9320, commercially available from E. I. du Pont de Nemours and Company.

The α-olefin is typically present in the acid polymer in an amount of 15 wt % or greater, or 25 wt % or greater, or 40 wt % or greater, or 60 wt % or greater, based on the total weight of the acid polymer. The acid is typically present in the acid polymer in an amount within a range having a lower limit of 1 or 2 or 4 or 6 or 8 or 10 or 12 or 15 or 16 or 20 wt % and an upper limit of 20 or 25 or 26 or 30 or 35 or 40 wt %, based on the total weight of the acid polymer. The optional softening monomer is typically present in the acid polymer in an amount within a range having a lower limit of 0 or 1 or 3 or 5 or 11 or 15 or 20 wt % and an upper limit of 23 or 25 or 30 or 35 or 50 wt %, based on the total weight of the acid polymer.

Additional suitable acid polymers are more fully described, for example, in U.S. Pat. Nos. 5,691,418, 6,562,906, 6,653,382, 6,777,472, 6,762,246, 6,815,480, and 6,953,820 and U.S. Patent Application Publication Nos. 2005/0148725, 2005/0049367, 2005/0020741, 2004/0220343, and 2003/0130434, the entire disclosures of which are hereby incorporated herein by reference.

The HNP is formed by reacting the acid polymer with a sufficient amount of cation source, optionally in the presence of a high molecular weight organic acid or salt thereof, such that at least 70%, preferably at least 80%, more preferably at least 90%, more preferably at least 95%, and even more preferably 100%, of all acid groups present are neutralized. The resulting HNP composition may optionally be plasticized with a plasticizer. Suitable plasticizers are described further below. In a particular embodiment, the cation source is present in an amount sufficient to neutralize, theoretically, greater than 100%, or 105% or greater, or 110% or greater, or 115% or greater, or 120% or greater, or 125% or greater, or 200% or greater, or 250% or greater of all acid groups present in the composition. The acid polymer can be reacted with the optional high molecular weight organic acid or salt thereof and the cation source simultaneously, or the acid polymer can be reacted with the optional high molecular weight organic acid or salt thereof prior to the addition of the cation source.

Suitable cation sources include metal ions and compounds of alkali metals, alkaline earth metals, and transition metals; metal ions and compounds of rare earth elements; and combinations thereof. Preferred cation sources are metal ions and compounds of magnesium, sodium, potassium, cesium, calcium, barium, manganese, copper, zinc, tin, lithium, and rare earth metals. The acid polymer may be at least partially neutralized prior to contacting the acid polymer with the cation source to form the HNP. Methods of preparing ionomers, and the acid polymers on which ionomers are based, are disclosed, for example, in U.S. Pat. Nos. 3,264,272, and 4,351,931, and U.S. Patent Application Publication No. 2002/0013413, the entire disclosures of which are hereby incorporated herein by reference.

Suitable high molecular weight organic acids, for both the metal salt and as a component of the ester plasticizer, are aliphatic organic acids, aromatic organic acids, saturated monofunctional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof, and combinations thereof. Salts of high molecular weight organic acids comprise the salts, particularly the barium, lithium, sodium, zinc, bismuth, chromium, cobalt, copper, potassium, strontium, titanium, tungsten, magnesium, and calcium salts, of aliphatic organic acids, aromatic organic acids, saturated monofunctional organic acids, unsaturated monofunctional organic acids, multi-unsaturated monofunctional organic acids, dimerized derivatives thereof, and combinations thereof. Suitable organic acids and salts thereof are more fully described, for example, in U.S. Pat. No. 6,756,436, the entire disclosure of which is hereby incorporated herein by reference. In a particular embodiment, the HNP composition comprises an organic acid salt in an amount of 20 phr or greater, or 25 phr or greater, or 30 phr or greater, or 35 phr or greater, or 40 phr or greater.

HNP compositions may optionally contain one or more melt-flow modifiers. The amount of melt-flow modifier in the composition is readily determined such that the melt-flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

If a melt-flow modifier is added, it may be selected from the group of traditional melt-flow modifiers including, but not limited to, the high molecular weight organic acids and salts thereof disclosed above, polyamides, polyesters, polyacrylates, polyurethanes, polyethers, polyureas, polyhydric alcohols, and combinations thereof. Also suitable are the non-fatty acid melt-flow modifiers disclosed in U.S. Pat. Nos. 7,365,128 and 7,402,629, the entire disclosures of which are hereby incorporated herein by reference. However, as discussed above, certain plasticizers are added to the composition of this invention, and it is recognized that such plasticizers may modify the melt-flow of the composition in some instances.

Some ionomeric compositions of golf balls of the present invention may include additive(s) and/or filler(s) in an amount within a range having a lower limit of 0 or 5 or 10 wt %, and an upper limit of 15 or 20 or 25 or 30 or 50 wt %, based on the total weight of the composition. Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof. Suitable additives are more fully disclosed, for example, in U.S. Patent Application Publication No. 2003/0225197, the entire disclosure of which is hereby incorporated herein by reference.

In some embodiments, the ionomeric composition is a "moisture resistant" composition, i.e., having a moisture vapor transmission rate ("MVTR") of 8 g-mil/100 $in^2$/day or less (i.e., 3.2 g-mm/$m^2$·day or less), or 5 g-mil/100 $in^2$/day or less (i.e., 2.0 g-mm/$m^2$·day or less), or 3 g-mil/100 $in^2$/day or less (i.e., 1.2 g-mm/$m^2$·day or less), or 2 g-mil/100 $in^2$/day or less (i.e., 0.8 g-mm/$m^2$·day or less), or 1 g-mil/100 $in^2$/day or less (i.e., 0.4 g-mm/$m^2$·day or less), or less than 1 g-mil/100 $in^2$/day (i.e., less than 0.4 g-mm/$m^2$·day). For example, suitable moisture resistant HNP compositions are disclosed, for example, in U.S. Patent Application Publication Nos. 2005/0267240, 2006/0106175, and 2006/0293464, the entire disclosures of which are hereby incorporated herein by reference.

The ionomeric compositions of the present invention are not limited by any particular method or any particular equipment for making the compositions. In a preferred embodiment, the composition is prepared by the following process. The acid polymer(s), plasticizers, optional melt-flow modifier(s), and optional additive(s)/filler(s) are simultaneously or individually fed into a melt extruder, such as a single or twin screw extruder. Other suitable methods for incorporating the plasticizer into the composition can be used. A suitable amount of cation source is then added such that the targeted percent (%) of all acid groups present are neutralized. The acid polymer may optionally be at least partially neutralized prior to the above process. The components are intensively mixed prior to being extruded as a strand from the die-head.

Many different types of ionomers are suitable layer materials for incorporating in golf ball constructions of the invention. Partially neutralized ionomers are disclosed, for example, in U.S. Patent Application Publication No. 2006/0128904, the entire disclosure of which is hereby incorporated herein by reference. Bimodal ionomers are disclosed, for example, in U.S. Patent Application Publication No. 2004/0220343 and U.S. Pat. Nos. 6,562,906, 6,762,246, 7,273,903, 8,193,283, 8,410,219, and 8,410,220, the entire disclosures of which are hereby incorporated herein by reference. Ionomer resins include, for example Surlyn® AD 1043, 1092, and 1022, commercially available from E. I. du Pont de Nemours and Company. Ionomers modified with resins, are disclosed, for example, in U.S. Patent Application Publication No. 2005/0020741, the entire disclosure of which is hereby incorporated by reference. Also suitable are conventional HNPs, such as those disclosed in U.S. Pat. Nos. 6,756,436, 6,894,098, and 6,953,820, the entire disclosures of which are hereby incorporated herein by reference.

In a particular embodiment, the HNP composition is selected from the relatively "soft" HNP compositions disclosed in U.S. Pat. No. 7,468,006, the entire disclosure of which is hereby incorporated herein by reference, and the low modulus HNP compositions disclosed in U.S. Pat. No. 7,207,903, the entire disclosure of which is hereby incorporated herein by reference. In a particular aspect of this embodiment, a sphere formed from the HNP composition has a compression of 80 or less, or 70 or less, or 65 or less, or 60 or less, or 50 or less, or 40 or less, or 30 or less, or 20 or less. In another particular aspect of this embodiment, the HNP composition has a material hardness within a range having a lower limit of 40 or 50 or 55 Shore C and an upper limit of 70 or 80 or 87 Shore C, or a material hardness of 55 Shore D or less, or a material hardness within a range having a lower limit of 10 or 20 or 30 or 37 or 39 or 40 or 45 Shore D and an upper limit of 48 or 50 or 52 or 55 or 60 or 80 Shore D. In yet another particular aspect of this embodiment, the HNP composition comprises an HNP having a modulus within a range having a lower limit of 1,000 or 5,000 or 10,000 psi and an upper limit of 17,000 or 25,000 or 28,000 or 30,000 or 35,000 or 45,000 or 50,000 or 55,000 psi, as measured using a standard flex bar according to ASTM D790-B.

In another particular embodiment, an HNP composition may be selected from the relatively "hard" HNP compositions disclosed in U.S. Pat. No. 7,468,006, the entire disclosure of which is hereby incorporated herein by reference, and the high modulus HNP compositions disclosed in U.S. Pat. No. 7,207,903, the entire disclosure of which is hereby incorporated herein by reference. In a particular aspect of this embodiment, a sphere formed from the HNP composition has a compression of 70 or greater, or 80 or greater, or a compression within a range having a lower limit of 70 or 80 or 90 or 100 and an upper limit of 110 or 130 or 140. In another particular aspect of this embodiment, the HNP composition has a material hardness of 35 Shore D or greater, or 45 Shore D or greater, or a material hardness within a range having a lower limit of 45 or 50 or 55 or 57 or 58 or 60 or 65 or 70 or 75 Shore D and an upper limit of 75 or 80 or 85 or 90 or 95 Shore D. In yet another particular aspect of this embodiment, the HNP composition comprises an HNP having a modulus within a range having a lower limit of 25,000 or 27,000 or 30,000 or 40,000 or 45,000 or 50,000 or 55,000 or 60,000 psi and an upper limit of 72,000 or 75,000 or 100,000 or 150,000 psi, as measured using a standard flex bar according to ASTM D790-B. Suitable HNP compositions are further disclosed, for example, in U.S. Pat. Nos. 6,653,382, 6,756,436, 6,777,472, 6,815,480, 6,894,098, 6,919,393, 6,953,820, 6,994,638, 7,375,151, the entire disclosures of which are hereby incorporated herein by reference. Plasticizers may be added to the above-described soft and hard and other HNP compositions.

In a particular embodiment, the HNP composition is formed by blending an acid polymer, a non-acid polymer, a cation source, and a fatty acid or metal salt thereof. The resulting HNP composition is plasticized with a plasticizer as described further below. For purposes of the present invention, maleic anhydride modified polymers are defined herein as a non-acid polymer despite having anhydride groups that can ring-open to the acid form during processing of the polymer to form the HNP compositions herein. The maleic anhydride groups are grafted onto a polymer, are present at relatively very low levels, and are not part of the polymer backbone, as is the case with the acid polymers, which are exclusively E/X and E/X/Y copolymers of ethylene and an acid, particularly methacrylic acid and acrylic acid.

In a particular aspect of this embodiment, the acid polymer may selected from ethylene-acrylic acid and ethylene-methacrylic acid copolymers, optionally containing a softening monomer selected from n-butyl acrylate, iso-butyl acrylate, and methyl acrylate. The acid polymer may for example have an acid content with a range having a lower limit of 2 or 10 or 15 or 16 weight % and an upper limit of 20 or 25 or 26 or 30 weight %.

Non-limiting further examples of suitable ionomers and/or HNPs may be found in U.S. Pat. Nos. 9,132,319; 9,095,748; 8,987,360; 8,337,332; 7,887,438; 7,887,437; 7,871,342; 7,357,736; 7,211,008; and 5,120,791, as well as in U.S. Appl. Publ. Nos. 2015/0031475; 2015/0111668; 2015/0190680; 2015/0099596; 2010/0099514; 2010/0048327; 2009/0017940; and 2003/0130434; each of which is hereby incorporated herein by reference in its entirety.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within ±0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

Hardness points should only be measured once at any particular geometric location.

The surface hardness of a golf ball layer is obtained from the average of a number of measurements taken from opposing hemispheres, taking care to avoid making measurements on the parting line of the core or on surface defects such as holes or protrusions. Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other.

It should be understood that there is a fundamental difference between "material hardness" and "hardness as measured directly on a golf ball." For purposes of the present disclosure, material hardness is measured according to ASTM D2240 and generally involves measuring the hardness of a flat "slab" or "button" formed of the material. Hardness as measured directly on a golf ball (or other spherical surface) typically results in a different hardness value. This difference in hardness values is due to several factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

It is understood that the golf balls of the invention as described and illustrated herein, represent only some of the many embodiments of the invention. It is appreciated by those skilled in the art that various changes and additions can be made to such golf balls without departing from the spirit and scope of this invention. It is intended that all such embodiments be covered by the appended claims.

A golf ball of the invention may further incorporate indicia, which as used herein, is considered to mean any symbol, letter, group of letters, design, or the like, that can be added to the dimpled surface of a golf ball.

It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

And the cover hardness and the hardness of any intermediate layers may be targeted depending on desired playing characteristics. As a general rule, all other things being equal, a golf ball having a relatively soft cover will spin more than a similarly constructed ball having a harder cover.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

The terms material(s) and composition(s) are used herein interchangeably.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball consisting of T layers, and each of T layers has a different volume V and comprises an ionomeric composition having a different % neutralization N; and
    wherein each inner layer of the T layers has an adjacent surrounding layer;
    wherein subscript n=1 identifies a spherical center, subscript n=2 identifies an outer core layer, subscript n=3 identifies an inner cover, and subscript n=4 identifies an outer cover; and
    wherein subscript n+1 identifies an adjacent surrounding layer for each of the spherical center, the outer core layer, and the inner cover which are inner layers;
    such that a volume $V_n$ and a % neutralization $N_n$ of each inner layer and a volume $V_{(n+1)}$ and % neutralization $N_{(n+1)}$ of each adjacent surrounding layer subscript n+1 satisfy the relationship $(V_n-V_{(n+1)}/V_n \geq (N_n N_{(n+1)}/N_{(n+1)})$;
    wherein the spherical center has a first volume $V_1$; the outer core layer has a second volume $V_2$; the inner cover has a third volume $V_3$, and the outer cover has a fourth volume $V_4$;
    wherein $V_4 < V_3 < V_2 < V_1$.

2. The golf ball of claim 1, wherein N for the ionomeric composition of the spherical center is 90 or greater.

3. The golf ball of claim 2, wherein N for the ionomeric composition of the outer core layer is from 70 to 90.

4. The golf ball of claim 3, wherein N for the ionomeric composition of the inner cover is from 50 to 75.

5. The golf ball of claim 4, wherein N of the outer cover is less than 55.

6. The golf ball of claim 5, wherein the spherical center has a first outer diameter $OD_1$; the outer core layer has a second outer diameter $OD_2$; the inner cover has a third outer diameter $OD_3$; and the outer cover has a fourth outer diameter $OD_4$; wherein $OD_4 > OD_3 > OD_2 > OD_1$ and $OD_1$ is about 1.3 inches or less, $OD_2$ is up to about 1.55 inches; and $OD_3$ is up to about 1.64 inches.

7. The golf ball of claim 6, wherein $OD_1$ is about 1.25 inches, $OD_2$ is about 1.51 inches; $OD_3$ is about 1.62 inches; and $OD_4$ is about 1.683 inches.

8. The golf ball of claim 7, wherein the spherical center has a first outer surface comprising a first outer surface hardness of 20 Shore D or greater; the outer core layer has a second outer surface comprising a second outer surface hardness of at least 40 Shore D; the inner cover has a third outer surface comprising a third outer surface hardness of at least 60 Shore D; and the outer cover has a fourth outer surface comprising a fourth outer surface hardness of 65 Shore D or less.

9. The golf ball of claim 1, wherein at least two adjacent layers of the T layers have uniform thicknesses and inner and outer surfaces that are non-planar.

* * * * *